(No Model.) 2 Sheets—Sheet 1.

A. P. NELMS.
NUT LOCK.

No. 482,949. Patented Sept. 20, 1892.

Witnesses
J. W. Garner
J. E. Briggs.

Inventor
Alex. P. Nelms,
per Freeman and Money
Attorneys.

(No Model.) 2 Sheets—Sheet 2.
A. P. NELMS.
NUT LOCK.
No. 482,949. Patented Sept. 20, 1892.
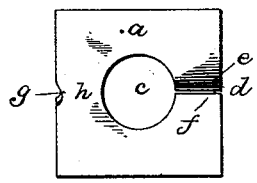
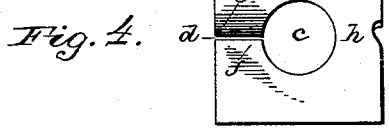
Fig. 4.
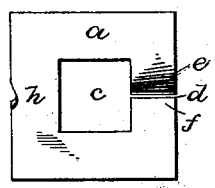
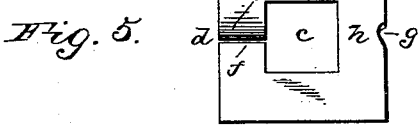
Fig. 5.
Fig. 6.
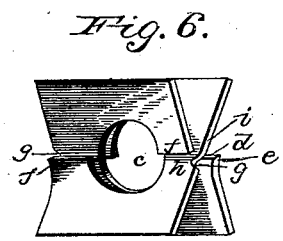
Witnesses
J. W. Garner
J. E. Briggs.
Inventor
Alex. P. Nelms,
per Freeman and Money
Attorneys.

UNITED STATES PATENT OFFICE.

ALEXANDER P. NELMS, OF GEORGETOWN, TEXAS.

NUT-LOCK.

SPECIFICATION forming part of Letters Patent No. 482,949, dated September 20, 1892.

Application filed January 9, 1890. Renewed February 26, 1892. Serial No. 422,857. (No model.)

*To all whom it may concern:*

Be it known that I, ALEXANDER P. NELMS, of Georgetown, county of Williamson and State of Texas, have invented a new and useful Improvement in Nut-Locks; and I do hereby declare that the following is a full, clear, and exact description of the invention, which will enable others skilled in the art to which it appertains to make and use it, reference being had to the accompanying drawings, forming a part thereof.

My invention relates to an improvement in nut-locks adapted to be used on railway-tracks and for vehicle and plow bolts and for other purposes; and it consists in the peculiar construction and combination of devices that will be more fully set forth hereinafter, and particularly pointed out in the claims.

The object of my invention is to provide a cheap, simple, and durable nut-lock which will be efficient to prevent a nut from working loose on a bolt, to prevent the bolt from turning in its socket, and to also permit the bolt to work or play slightly in its socket to yield to the movement of the rails when a train is passing.

Figure 1:
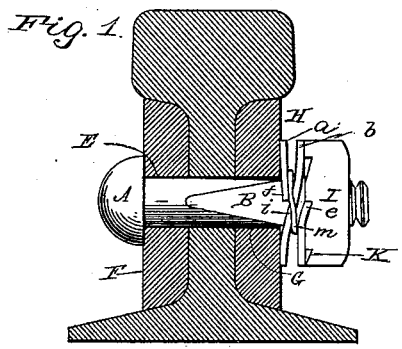
Figure 2:
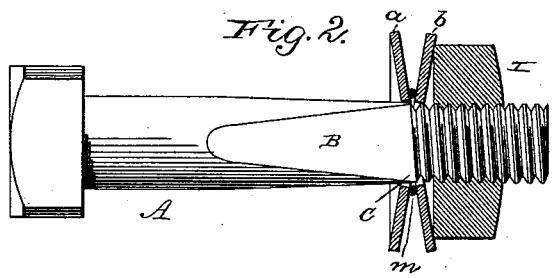
Figure 3:
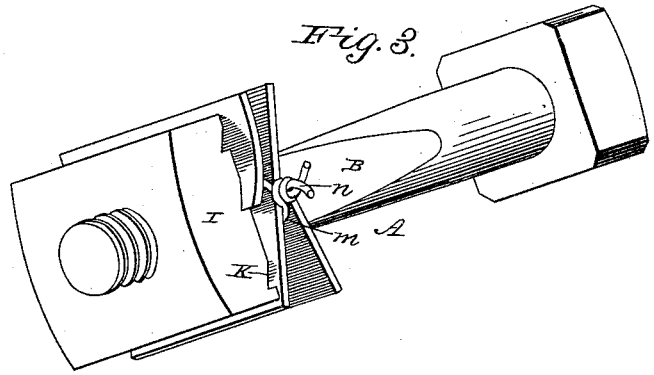

In the accompanying drawings, which fully illustrate my invention, Figure 1 is an elevation of a bolt provided with a nut-lock embodying my improvements, the same being shown applied to a railway-joint, and the rail and fish plates being shown in section. Fig. 2 is a detailed elevation of a bolt provided with my improved nut-lock, the latter and the nut being shown in section. Fig. 3 is a perspective view of my improved bolt and nut-lock. Fig. 4 is a detailed plan view of the washers. Fig. 5 is a similar view of a modified form of the washers. Fig. 6 is a perspective view of the washers, showing the latter in the position in which they are applied to the bolt and nut.

The bolt A is of the usual form, with the exception that its shank is squared and slightly tapered, as at B, for a suitable distance from its threaded portion, thus forming a shoulder C. When the bolt is used on a railway-joint, the construction of the latter is as follows: The opening E in the fish-plate F next the head of the bolt is circular, and the opening G in the fish-plate H next the threaded portion of the bolt is square and slightly larger than the angular stem of the bolt that passes through it. The opening in the shank of the rail is also slightly larger than the bolt-shank, and thus the bolt is adapted to conform to the motion of the rail when a train is passing.

The nut I has on its under side a series of radial notches or ratchets K.

To lock the nut on the bolt, I have devised a pair of washers $a$ $b$, which are preferably rectangular in form and have square central openings $c$, slightly larger than the shank of the bolt, and through which the latter is adapted to pass. The said pair of washers are split on opposite sides from their central openings to their outer edges, as at $d$, thereby forming lips $e$ $f$, which are bent outward in opposite directions from the planes of the washers, as shown. Directly opposite the slits $d$ the washers are provided with notches $g$ in their edges, as shown. The lips $e$ $f$ are forced outward sufficiently to permit the washers to be interlocked, as shown in Fig. 6, thus bringing their lips on opposite edges and enabling the washers to turn or play as on a common axis in line with the slits. It will be observed by reference to Fig. 6 that the integral portions of the washers are disposed between the pairs of lips, so that the latter cannot possibly be forced together, and hence they will be at all times without the planes of the washers and in position to engage the notches of the nut, as shown in Figs. 1 and 3. The integral portions $h$ of the washers opposite the slits are offset or bent in the form of a compound curve, as at $i$, Fig. 1. The washers are preferably made of steel or other resilient metal to adapt the lips to spring into the notches of the nut or to bite into the base of the same and into the fish-plate or its equivalent.

When the shank of the bolt is square and the openings of the washers are rectangular, the said washers cannot turn on the bolt and the latter cannot turn in the rail-joint, and consequently the nut is not only locked, so that it cannot work loose on the bolt, but the latter is also absolutely prevented from turning, and hence it is absolutely impossible for the bolt or nut to get loose.

In order to impart additional resilience to the washers, and hence increase the efficiency of the nut-lock, I employ a wire or key $m$, which is bent in the form of a loop and passed around the bolt-shank and between the washers, the said wire or key being engaged with the notches g of the washers and the ends thereof being twisted, as at n, thus drawing the loop tight and serving to keep the edges of the washers apart. The said wire loop forms the fulcrum on which the washers must turn when compressed by screwing on the nut, and the wire loop not only serves to increase the resilience of the washers, but also becomes somewhat flattened and impinged against the threads on the bolt, thereby adding to the security of the nut-lock, as will be readily understood.

The washers may be of any desired size, and the openings in the washers may be circular, as shown in Fig. 4, when they are to be used on a bolt having a cylindrical stem.

It will be understood that my invention is adapted not only for locking nuts and bolts on railways, but also for use on vehicle-bolts, plow-bolts, and bolts employed on machinery of various kinds.

In some instances it may be desirable to use the nut-locking washers in connection with nuts which are not provided with base-notches, and I have found that my improved devices are very efficient with such nuts, and hence I do not desire to limit myself to the use of a nut having such base-notches. I have also found that my improved locking-washers are efficient without the wire loop or key, and hence I do not desire to limit myself to the use of such loop or key in connection with my improved interlocking washers.

When the wire loop or key is not used, the washers should not be provided with the notches g in their edges, and I do not limit myself to the use of said notches.

Having thus described my invention, I claim—

1. The nut-lock comprising the pair of interlocked washers, each having an opening for the bolt, a slit extending from the said opening to one edge, and the lips bent outward from the slit, the integral portion of each washer being arranged in the slit of the other, and thereby interposed between the lips, for the purpose set forth, substantially as described.

2. The combination, with the bolt and the nut, of the pair of interlocked washers having the central openings for the bolt-shank, the slits extending from said openings to opposite edges, and the lips formed by bending opposite sides of said slits beyond the planes of the washers and adapted to engage the base of the nut, substantially as described.

3. The combination of the bolt having the angular shank, the nut, and the pair of interlocked washers having angular openings for the bolt-shank and having lips to engage the base of the nut, substantially as described.

4. The combination, with the bolt and nut, of the pair of interlocked washers having the lips to engage the base of the nut and the wire loop or key between the said washers and forming the fulcrum therefor, for the purpose set forth, substantially as described.

5. The nut-locking device comprising the pair of interlocked washers having the slits on opposite sides, the lips bent outward from the slits, and the integral portions arranged between the respective pairs of lips, whereby the latter are prevented from being pressed inward to the planes of the washers, substantially as described.

6. The nut-locking device comprising the pair of interlocked washers, each having the slit on one side, the pair of lips, and the integral portion opposite the lips, the said integral portions of the washers being in the form of a compound curve, substantially as described.

In testimony that I claim the foregoing I append my signature.

ALEXANDER P. NELMS.

Witnesses:
J. W. GARNER,
S. A. TERRY.